No. 727,368. PATENTED MAY 5, 1903.
E. J. HOWARD.
SOAP HANDLE.
APPLICATION FILED OCT. 28, 1901.
NO MODEL.

WITNESSES:
Henry Krug
Russell M. Everett

INVENTOR
Edward J. Howard,
BY
Drake & Co.
ATTORNEYS.

No. 727,368. Patented May 5, 1903.

UNITED STATES PATENT OFFICE.

EDWARD J. HOWARD, OF NEW YORK, N. Y., ASSIGNOR TO HIMSELF, JOSEPH SIMON, AND JESSIE G. MILLER, OF NEW YORK, N. Y.

SOAP-HANDLE.

SPECIFICATION forming part of Letters Patent No. 727,368, dated May 5, 1903.

Application filed October 28, 1901. Serial No. 80,368. (No model.)

*To all whom it may concern:*

Be it known that I, EDWARD J. HOWARD, a citizen of the United States, residing at New York, borough of Manhattan, and State of New York, have invented certain new and useful Improvements in Soap-Handles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide an improved soap-handle for application to a cake of soap in using the same for scrubbing, laundry purposes, or the like, to obtain a simple and cheap construction and one which will fit any-sized cake of soap, and secure other advantages and results, some of which will be referred to hereinafter in connection with the description of the working parts.

The invention consists in the improved soap-handle and in the arrangements and combinations of parts of the same, all substantially as will be hereinafter set forth and finally embraced in the clauses of the claim.

Figure 4:
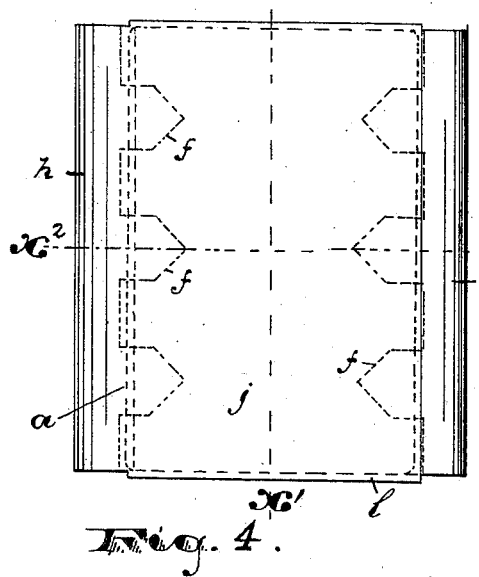
Figure 5:
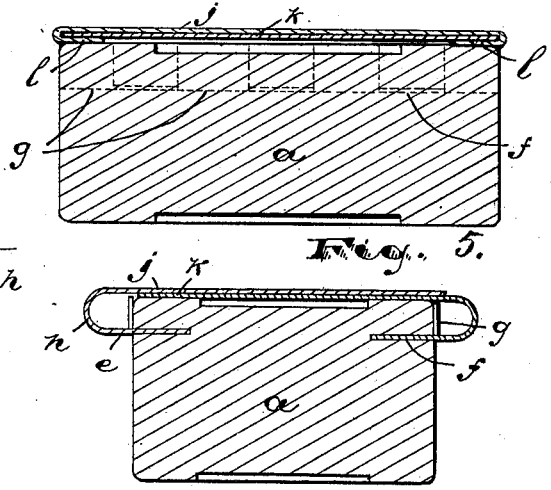
Figure 6:
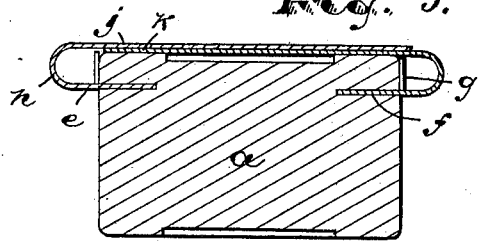
Figure 1:
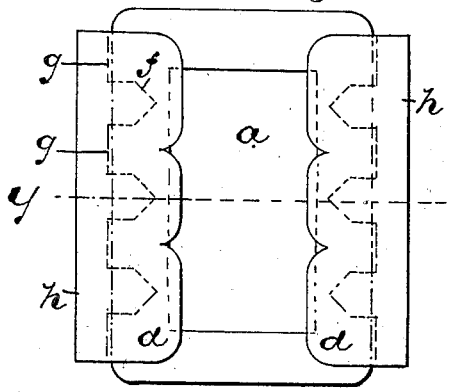
Figure 2:
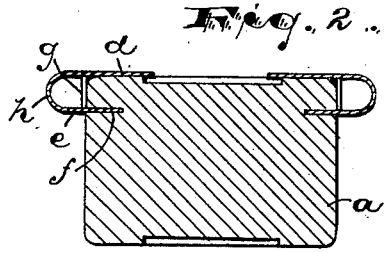
Figure 3:
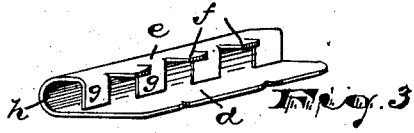

Referring to the accompanying drawings, in which like letters of reference indicate corresponding parts in each of the several figures, Figure 1 is a plan view of my invention as applied to a soap cake in its preferred form, and Fig. 2 is a cross-section of the same on line $y$. Fig. 3 is a perspective view of a handle detached. Fig. 4 is a plan showing means for slidably connecting two handles oppositely disposed on a soap cake; and Figs. 5 and 6 are longitudinal and transverse sections of the same on lines $x'$ and $x^2$, respectively.

In said drawings, $a$ indicates a bar or cake of soap of any size or form commonly used and to which my handles are adapted to be applied so as to project out from the sides of the soap and afford finger-holds. In carrying out the invention two such handles are used, one at each side of the bar and each being held in place by being partially entered or driven into the soap. The hand then reaching across the soap cake tends to force the handles further into the soap, so that a stop is preferably employed to limit insertion of the handles. Each handle consists, therefore, of a body portion to lie against the soap bar and be engaged by the fingers and a member projecting from said body portion to be driven into the soap bar. Preferably the handle is made of a sheet of metal or other suitable material bent or folded into a U-shape in cross-section. One side or leaf, as $d$, is wider than the other and adapted to lie flat upon the top of the soap cake, while the other leaf $e$ is presented edgewise against the side of the cake. Said last-mentioned leaf $e$ is adapted to be forced into the soap, preferably having prongs $f$ for the purpose. The portions $g$ of the leaf between the said prongs are also bent toward the other side or leaf of the handle, so as to lie at right angles to the said prongs and come flatwise against the side of the soap cake to serve as a stop to limit the insertion of said teeth, and thus cause the curved portion $h$ of the handle to stand out from the soap.

Such handles are very simple and easily applied to the opposite edges of a bar or cake of soap and forced into position by pressure of the hand. They then retain their place until the soap is used up, enabling the cake to be handled like a scrubbing-brush and without wearing the user's fingers.

The two handles of a pair thus formed are precisely alike and can be formed by one die, so that there are no rights and lefts. Furthermore, the broad upper leaf or side of a handle furnishes a convenient and appropriate place for stamped or printed matter, so that the device can be used as an advertising novelty, if desired.

It will be obvious that my improved handle may be bent up into other forms than the one specifically described so long as prongs or projections are provided to enter the cake and a rest or surface to be seated against the outer surface, and I do not wish to be understood as limiting myself by the positive descriptive terms employed except as the state of the art may require.

Under some conditions two handles of my improved construction may be adjustably connected, as shown in Figs. 4, 5, and 6, where the upper sides or leaves $j$ $k$, which lie upon the top of the soap cake, are extended a greater or less distance across the cake and over one upon the other. One leaf is then slidably connected to the other, as by side flanges $l$, bent over the edges of the said other leaf, or in any other suitable manner. By this construction the whole top of the soap cake is covered and also a greater space is provided for advertising matter.

Having thus described the invention, what I claim as new is—

1. A soap-handle comprising a piece of sheet metal bent into U shape in cross-section, one of the two substantially parallel leaves thus provided being shorter than the other and providing at its edge a series of prongs or teeth.

2. A soap-handle comprising a piece of sheet metal bent to form two substantially parallel leaves, one of said leaves having a series of slits extending inward from its edge, alternate portions between said slits being bent at substantially right angles toward the other leaf, and the remaining portions forming teeth or prongs adapted to enter the soap.

3. A soap-handle comprising a piece of sheet metal bent to form two substantially parallel leaves or portions, one of which is provided at its edge with teeth adapted to enter one side of the soap cake and the other of which is adapted to overlie the top of the soap cake, one of said leaves having a portion of itself bent to form a stop disposed at right angles to said parallel portions and adapted to lie flatwise against that side of the soap cake which said teeth enter.

4. The combination of two soap-handles, each comprising a piece of sheet metal bent into U shape in cross-section, one of the parallel portions thus formed providing at its edge teeth or prongs adapted to enter the side of a soap cake and the other being longer than the first and adapted to overlie the top of the soap cake, and means slidably connecting said longer portions.

5. The combination of two soap-handles, each comprising a piece of sheet metal bent into U shape in cross-section, one of the parallel portions thus formed providing at its edge teeth or prongs adapted to enter the side of a soap cake, and the other being considerably longer than the first and adapted to lie upon the top of the soap cake, the two handles having their said longer portions overlapping one upon the other and the lateral edges of one being bent inward over the other to form a slideway therefor.

In testimony that I claim the foregoing I have hereunto set my hand this 3d day of October, 1901.

EDWARD J. HOWARD.

Witnesses:
CHARLES H. PELL,
RUSSELL M. EVERETT.